(12) United States Patent
Gaj-Jablonski

(10) Patent No.: US 11,236,670 B2
(45) Date of Patent: Feb. 1, 2022

(54) INTERNAL COMBUSTION ENGINE WITH TWO WORKING SPACES OF A CYLINDER

(71) Applicant: Wojciech Gaj-Jablonski, Oakville (CA)

(72) Inventor: Wojciech Gaj-Jablonski, Oakville (CA)

( * ) Notice: Subject to any disclaimer, the term of this patent is extended or adjusted under 35 U.S.C. 154(b) by 59 days.

(21) Appl. No.: 16/605,185

(22) PCT Filed: Apr. 13, 2017

(86) PCT No.: PCT/PL2017/000042
§ 371 (c)(1),
(2) Date: Oct. 14, 2019

(87) PCT Pub. No.: WO2018/190736
PCT Pub. Date: Oct. 18, 2018

(65) Prior Publication Data
US 2020/0173357 A1   Jun. 4, 2020

(51) Int. Cl.
*F02B 75/28* (2006.01)
*F01B 7/16* (2006.01)
(Continued)

(52) U.S. Cl.
CPC ............. *F02B 75/287* (2013.01); *F01B 7/16* (2013.01); *F01B 9/02* (2013.01); *F01N 3/046* (2013.01);
(Continued)

(58) Field of Classification Search
CPC ........ F02B 75/287; F02B 25/02; F02B 33/40; F02B 41/04; F02B 47/02; F02B 2075/025;
(Continued)

(56) References Cited

U.S. PATENT DOCUMENTS 3,159,147 A * 12/1964 Brown ................... F02B 75/28
 123/41.76
4,332,229 A   6/1982 Schuit
(Continued)

FOREIGN PATENT DOCUMENTS

FR  1025842 A  * 4/1953  ............ F02B 75/287
GB  191303618 A * 7/1913  ............ F02B 75/287
WO  2015133916 A1   9/2015

OTHER PUBLICATIONS

International Search report for PCT/PL2017/000042, Prepared by Polish Patent Office, dated Jan. 11, 2018, 3 Pages.

*Primary Examiner* — Jacob M Amick
*Assistant Examiner* — Charles J Brauch
(74) *Attorney, Agent, or Firm* — Own Innovation; James W. Hinton

(57) ABSTRACT

An engine having a cylinder fastened to the engine ease with the biconcave internal partition, which divides the cylinder into the upper and bottom parts. Sparking plugs are mounted on both sides of the partition. The upper and the bottom parts of the cylinder have side scavenging channels which connect suction spaces to the working spaces of both parts of the cylinder. The upper and bottom parts of the cylinder have inlet and outlet orifices. Inside the upper and inside the bottom part of the cylinder and the upper and bottom piston are placed respectively, while both pistons are directed towards each other by the working surfaces. The pistons are connected by a rod that is led through the linear bearing that is embedded in the partition forming a seal. The connecting rod is fastened to the bottom piston and by its other end it is connected to the crankshaft.

8 Claims, 3 Drawing Sheets

Figure 1:
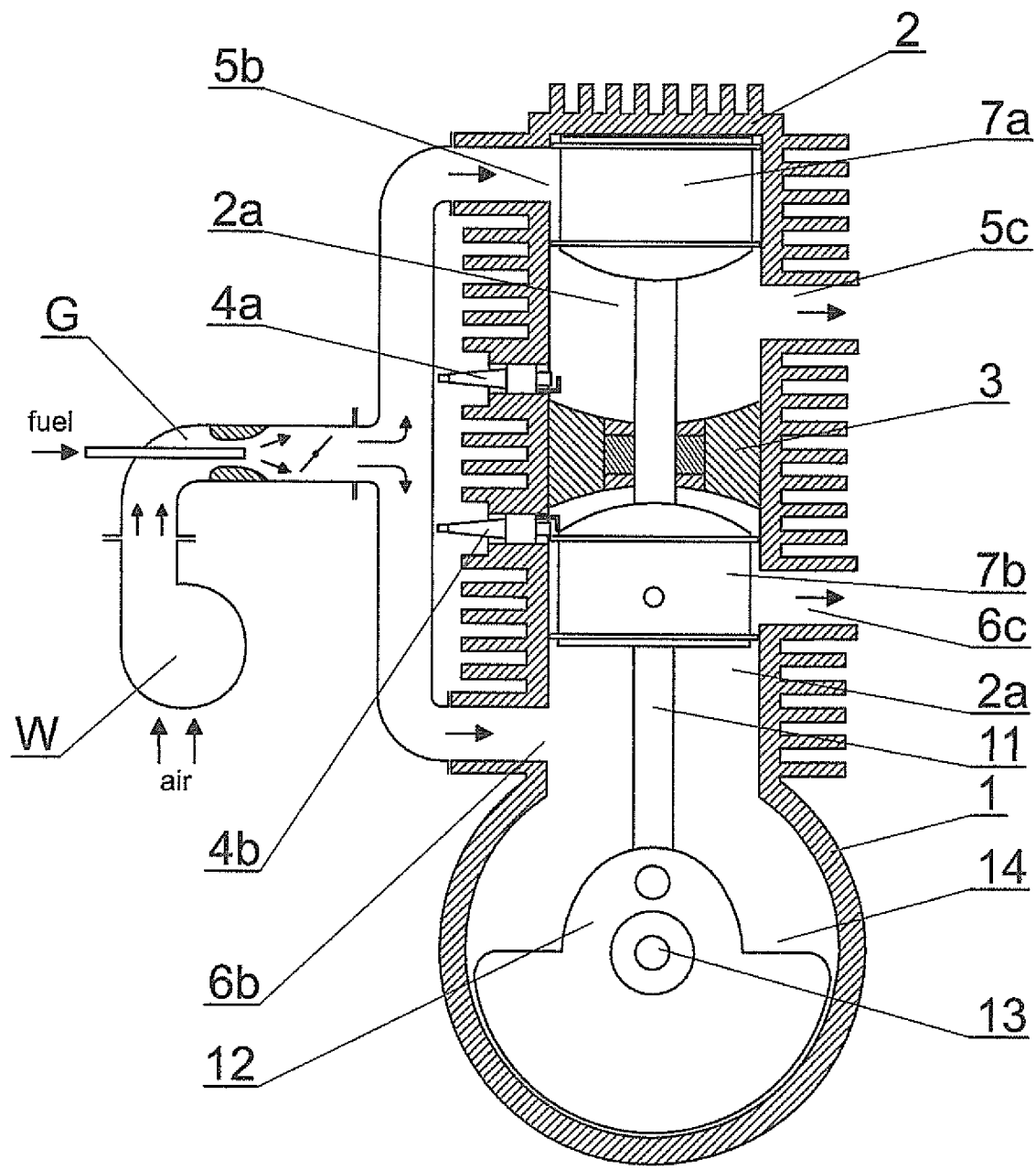

(51) Int. Cl.
*F01B 9/02* (2006.01)
*F01N 3/04* (2006.01)
*F02B 25/02* (2006.01)
*F02B 33/40* (2006.01)
*F02F 3/28* (2006.01)
*F02F 7/00* (2006.01)
*F02M 25/022* (2006.01)
*F02M 25/03* (2006.01)
*F02M 61/14* (2006.01)

(52) U.S. Cl.
CPC .............. *F02B 25/02* (2013.01); *F02B 33/40* (2013.01); *F02F 3/28* (2013.01); *F02F 7/0043* (2013.01); *F02M 25/0224* (2013.01); *F02M 25/03* (2013.01); *F02M 61/14* (2013.01)

(58) Field of Classification Search
CPC .. F02B 33/04; F02B 75/32; F01B 7/16; F01B 9/02; F01N 3/046; F02F 3/28; F02F 7/0043; F02M 25/0224; F02M 25/03; F02M 61/14; Y02T 10/12
See application file for complete search history.

(56) References Cited

U.S. PATENT DOCUMENTS

| | | | |
|---|---|---|---|
| 4,543,916 A | 10/1985 | Giorno | |
| 5,791,303 A | 8/1998 | Skripov | |
| 6,854,429 B2 | 2/2005 | Gelfand | |
| 2015/0020768 A1* | 1/2015 | Yi | F02B 23/105 123/305 |
| 2017/0022924 A1* | 1/2017 | Fujimoto | F02M 25/0224 |

* cited by examiner

INTERNAL COMBUSTION ENGINE WITH TWO WORKING SPACES OF A CYLINDER

CROSS-REFERENCE TO RELATED APPLICATION

This application is the U.S. national phase of PCT Application No. PCT/PL2017/000042 filed on Apr. 13, 2017, the disclosures of which is incorporated in its entirety by reference herein.

The object of the invention is the internal combustion engine with two working spaces of a cylinder, which is designed for the drive of land, aerial and water vehicles as well as various kinds of machinery.

The combustion engine which is known from the U.S. Pat. No. 6,854,429 patent description has a double-acting piston, contains at least one cylinder with a double symmetrical piston situated inside that divides the free space of the cylinder into two working spaces. Bilateral closing cylinder heads are equipped with fuel inflow valves and valves that carry off exhaust gases as well as with an ignition element in the form of a sparking plug or a glow plug. There is a tappet rod stiffly mounted on the one side of the double piston, which is transferred outside the cylinder through a sealed opening in a partition that separates the cylinder from an engine case. The end of this rod is connected to a yoke of a stabilizer, whereas the stabilizer is connected to a power transfer yoke, and in the place where these two yokes are connected there is an arm of a stabilizing limiter attached in a oscillating way, which by its other side is connected to the engine case. The power transfer yoke by its other side is connected to a crankshaft, which constitutes a part of a crank unit, on whose one end a flywheel is located and on the other side there is a timing wheel connected via a timing strap to a camshaft. The oil circulation system in the lubrication system has a task to supply oil to the space formed between a cylindrical necking in the middle of the piston and the central part of the cylinder, from where oil is subsequently transferred towards an oil sump via the appropriate system of channels, which are situated inside the piston, and it goes farther via the channel located on the axis of a piston rod. Cams mounted on the camshaft steer adequately by tappets of head valves that close the cylinder in compression with work of sparking plugs. The engine operates in the four-stroke cycle in an alternate manner for each combustion chamber per 180 degrees of a crankshaft turn.

Moreover, the two-stroke engine is commonly known, which has a head with a sparking plug placed on a cylinder and it has an inlet orifice in a cylinder's wall, through which a fuel blend is supplied from a carburetor system into a cylinder space under a piston and into a crankcase space connected to the cylinder space, besides it has an outlet situated in the upper part of the cylinder wall that carries away exhaust gases to an exhaust manifold. Both spaces of the cylinder, below and above the piston, are connected via side scavenging channels, which enable to shift the fuel blend from the space blow the piston to the working space above the piston in its reciprocating motion. The piston in the known engine is connected via an oscillating connecting rod to a crank of a crankshaft, located in the crankcase. A vertical distance between inlet orifices and outlets is chosen in such a way that these channels can be alternately closed and opened with the use of the side wall of the piston.

The engine according to the invention has the cylinder fastened to the engine case which has an internal double-sided concave partition that divides the cylinder into the upper part of the cylinder and the bottom part of the cylinder, whereas sparking plugs are mounted in the wall of the upper part of the cylinder as well as in the wall of the bottom part of the cylinder, on both sides of the internal partition. The upper part of the cylinder has at least one upper scavenging side channel, which links the suction space of the upper part of the cylinder to the working space of this part of the cylinder as well as it has at least one upper inlet orifice and one upper outlet. Similarly, the bottom part of the cylinder has at least one bottom scavenging side channel, which links the suction space of the bottom part of the cylinder to the working space of this part of the cylinder as well as it has at least one bottom inlet orifice and one bottom outlet. Inside the upper part of the cylinder the upper piston is located, whereas inside the bottom part of the cylinder the bottom piston is located, while the upper piston and the lower piston are directed towards each other by their convex working spaces and they are connected together with the help of the rod in the form of a ground shaft. The rod is led through a linear bearing mounted in the partition. Sealing elements are placed on both sides of the linear bearing. On the other side the connecting rod is fastened to the piston, which by its other end is connected to the crank of the crankshaft, situated in the crankcase, that is the internal space of the engine case.

In the first variant of the engine realization the exit of the common carburetor is attached to the upper inlet orifice as well as to the bottom outlet. The outlet of the fan is attached to the entry of the carburetor.

In the second variant of the engine realization on both sides of the internal partition in the wall of the upper part of the cylinder as well as in the wall of the bottom part of the cylinder apart from sparking plugs, fuel injectors and water injectors are mounted, and the outlet of the common fan is attached to the upper inlet orifice and to the bottom inlet orifice. The water injectors are connected by water pipes to the water container through batching devices assigned to them. Between the water container and particular batching devices there is a water heating element, which is mounted on the exhaust manifold that is connected to outlet channels of exhaust gases.

One of advantages of the solution according to the invention is the combination of two positive features of the engine that has no valves, together with the advantage of the solution of the engine with the double piston and two combustion chambers inside, in which two work cycles occur per 180° during a full turn of the crankshaft. The other benefit of this solution is the complete and effective disconnecting of the zone of the cylinder combustion chambers from the space of the crankcase, which prevents oil from being transferred to expelled combustion products. With regard to that, there is no need to employ a resonant exhaust system that is generally used. It contributes to the fact that the described engine is an ecological device, which corresponds to the highest standards of devices of this type. The next feature of the engine solution according to the invention is its simple construction, which does not require many complex extra elements, and owing to the requirement of low air pressure used to scavenge the cylinder space, it is sufficient to use a small fan instead of a compressor that is usually used. This, as well as no need to use a complicated timing system of valves work, which is employed in the known solution, have an effect that the engine according to the invention maintains a positive power to weight ratio. This engine may be produced in various multi-cylinder systems, such as the in-line system, the boxer type system or the radial system. In particular, in the radial system of cylinders the engine can be used in light aviation constructions, powerboats and other similar devices. The engine that is being described may be, depending on the use of a sparking element, supplied by virtually all available liquid fuel or fuel gas, including gasoline, diesel oil as well as hydrogen.

Figure 2:
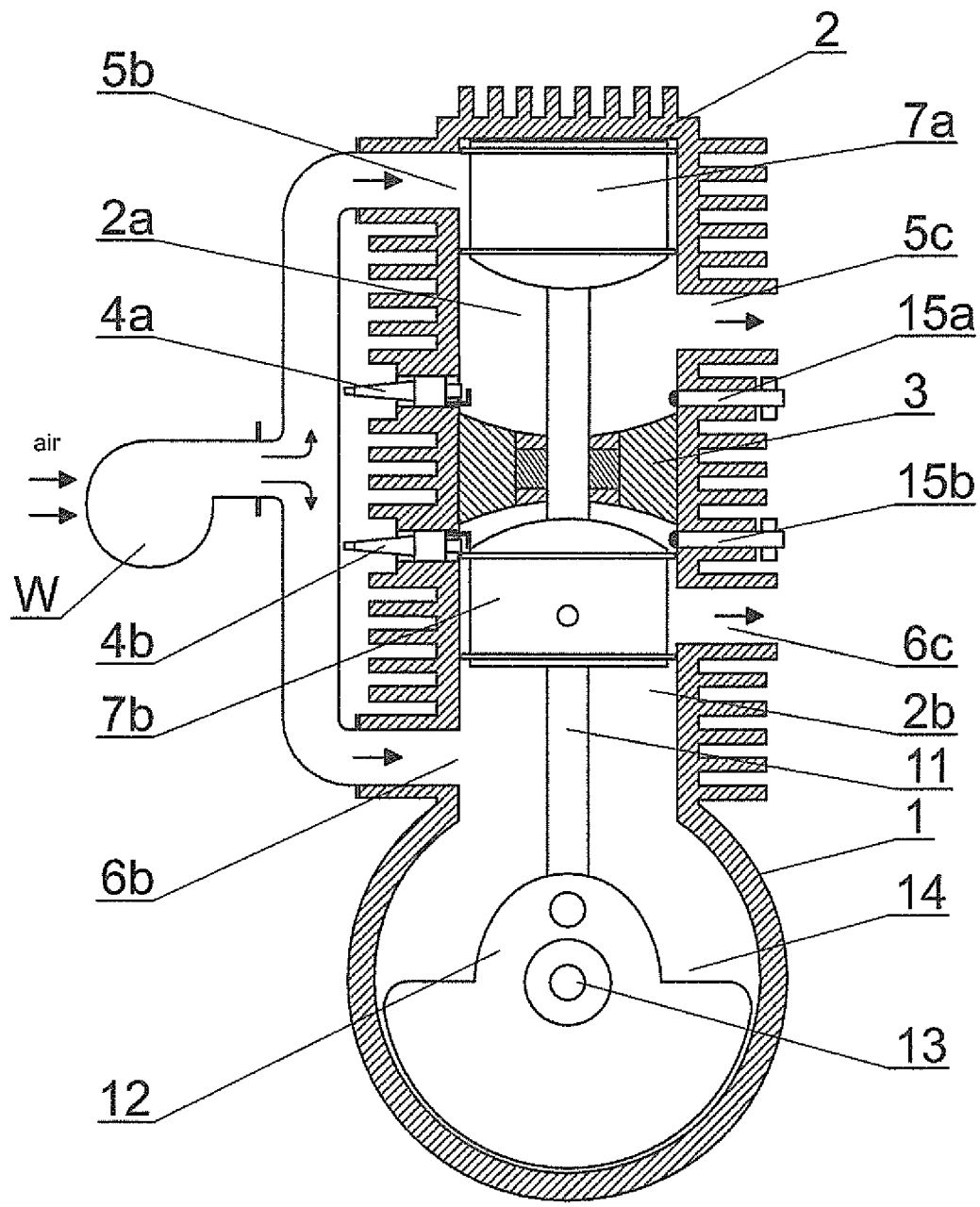
Figure 3:
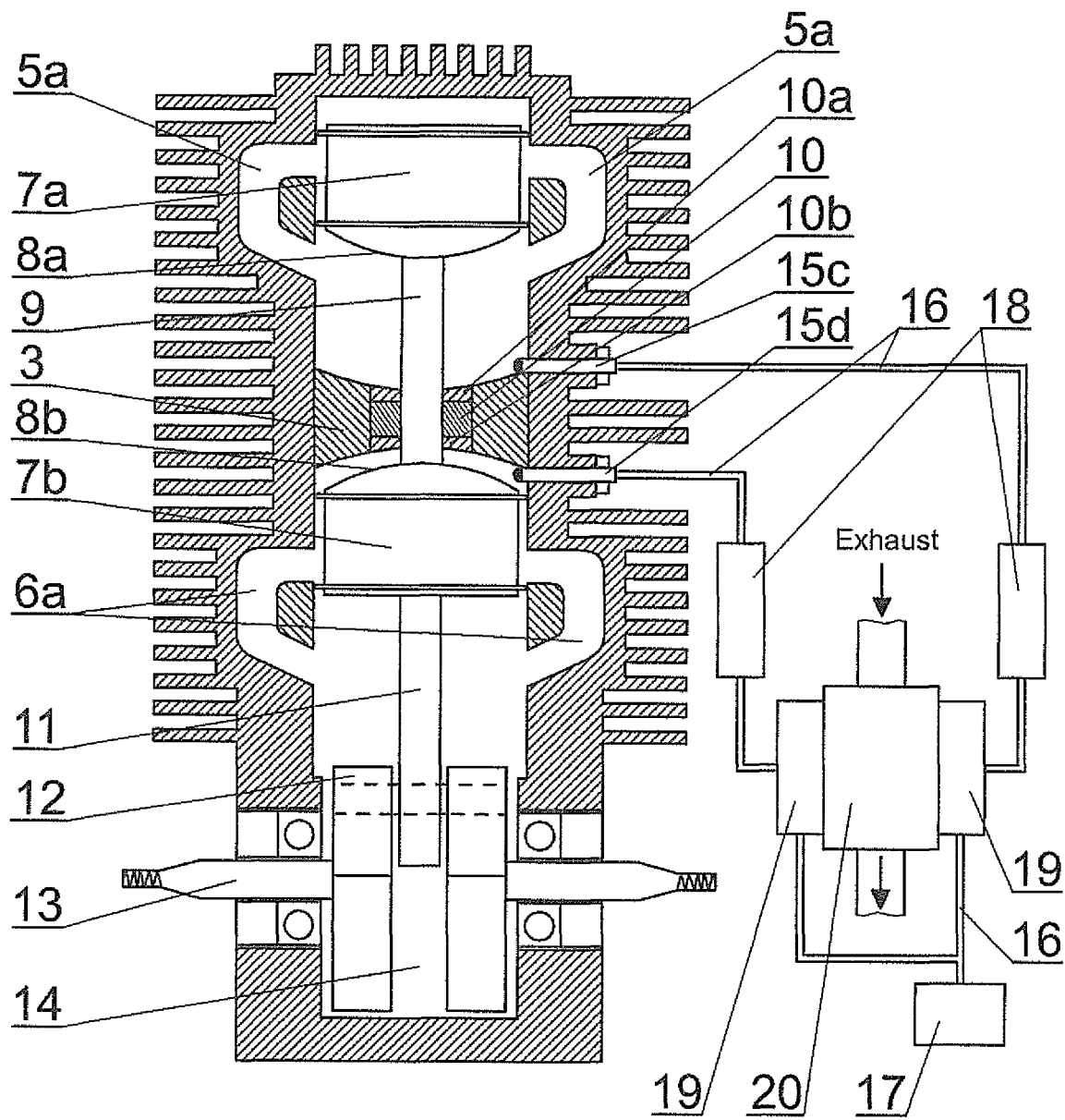

The object of the invention is presented on the realization example in the picture, in which FIG. 1 shows the engine intersection according to the first version of the realization, FIG. 2 shows the engine intersection according to the second version of the realization, while FIG. 3 presents the perpendicular intersection of the engine applicable to both versions of the realization.

The engine has the cylinder 2 fastened to the engine case 1 with the biconcave internal partition 3, which divides the cylinder 2 into the upper part of the cylinder 2a and the bottom part of the cylinder 2b, whereas the sparking plugs 4a, 4b are mounted on the both sides of the partition 3, in the wall of the upper part of the cylinder 2 and in the wall of the bottom part of the cylinder 2b. The upper part of the cylinder 2a has two upper scavenging side channels 5a, which connect the suction space of the upper part of the cylinder 2a to the working space of this part of the cylinder as well as they connected the upper inlet orifice 5b and the upper outlet orifice 5c. Similarly, the bottom part of the cylinder 2b has two bottom scavenging side channels 6a, which connect the suction space of the bottom part of the cylinder 2b to the working space of this part of the cylinder as well as they connect the bottom inlet orifice 6b and the bottom outlet orifice 6c. Inside the upper part of the cylinder 2a the upper piston 7a is situated, and inside the bottom part of the cylinder 2b the bottom piston 7b is situated, while the upper piston 7a and the bottom piston 7b are directed towards each other by their convex working surfaces 8a, 8b, and they are connected to each other with the help of the rod 9 in the form of the ground shaft. The rod 9 is led through the linear bearing 10 that is mounted in the partition 3 and on which two sides sealing elements 10a, 10b are placed. The connecting rod 11 is fastened to the other side of the bottom piston 7b and by its other end it is linked to the crank 12 of the crankshaft 13, which is located in the crankcase 14 that constitutes the internal part of the engine case 1.

In the first variant of the engine realization the exit of the common carburetor G is attached to the upper inlet orifice 5b and to the bottom inlet orifice 6b, and the entry of the carburetor it attached to the outlet of the fan W.

In this variant the engine is fed by the mixture of gasoline with the addition of lubricating oil as in standard two-stroke engines.

In the second variant of the engine realization on both sides of the partition 3 in the wall of the upper part of the cylinder 2a and in the wall of the bottom part of the cylinder 2b apart from the sparking plugs 4a, 4b the fuel injectors 15a and 15b and the water injectors 15c and 15d are mounted, and the outlet of the common fan W is attached to the upper inlet orifice 5b and to the bottom inlet orifice 6b. The water injectors 15c and 15d are connected via water cables 16 to the water tank 17 through the batching devices 18 assigned to them. Between the water tank 17 and particular batching devices 18 the water heating element 19 is located, which is embedded on the exhaust manifold 20 that is attached to the exhaust passages 5c and 6c.

In this variant the engine is fed by fuel without any addition of lubricating oil, whereas the separate oiling system, known from four-stroke engines, is used to lubricate the piston and crank unit.

The engine operation according to the invention is similar to the operation of the known two-stroke engine, including two coupled and collaborating pistons 7a an 7b in the two separated parts of the common cylinder 2.

In the first variant of the invention, at a time when the engine is activated and both pistons move upwards, the bottom inlet orifice 6b is opened by the bottom piston 7b and the fuel blend is sucked from the carburetor G into the suction space of the bottom part of the cylinder 2b and into the crankcase space 14 as well as into the bottom scavenging channels 6a that are opened from below.

In the course of the further upward movement of the bottom piston 7b, the bottom outlet orifice 6c is closed, and when the bottom piston 7b reaches TDC the fuel blend is ignited by the spark of the sparking plug 4b in the working space of the bottom part of the cylinder 2b above the bottom piston 7b, and subsequently this piston moves towards its BDC. In this phase of work, initial compression of the fuel blend occurs in the space below the bottom piston 7b as well as in the bottom scavenging channels 6a, which then reaches the working space above the bottom piston 7b after opening upper slots of the bottom scavenging channels 6a. A part of the fuel blend pushes out remaining exhaust gases to the exhaust manifold of the engine through the bottom outlet orifice 6c, whereas its substantial part remains in the working space of the bottom part of the cylinder 2b above the bottom piston 7b as fuel that will be used during the next work cycle.

In the same work cycle of the engine operation the upper inlet orifice 5b is opened by the upper piston 7a that is coupled with the bottom piston 7b as well as the fuel bled is sucked from the carburetor G into the suction space of the upper part of the cylinder 2a and into the upper scavenging channels 5a that are opened from above. When the bottom piston 7b reaches its BDC, it again starts the reciprocating motion upwards. In this phase of work the fuel blend is once again sucked from the carburetor G into the suction space of the bottom part of the cylinder 2b and into the space of the crankcase 14 that is connected to it as well as into the bottom scavenging channels 6a that are opened from below. Simultaneously, in this phase of work initial compression of the fuel blend occurs in the space below the upper piston 7a as well as in the upper scavenging channels 5a, which reaches the working space below the upper piston 7a after opening bottom slots of the upper scavenging channels 5a. Once more the ignition of the fuel blend, in the working space of the bottom part of the cylinder 2b above the bottom piston 7b, makes both pistons move downwards, and at a time when the upper piston 7a reaches its TDC the fuel blend is ignited by the sparking plug 4a in the working space of the upper part of the cylinder 2b below the upper piston 7a as well as it causes that this piston moves towards its BDC. The fuel blend accumulated above the upper piston 7a as well as in the upper scavenging channels 5a undergoes initial compression, whereas after the bottom slots of the bottom scavenging channels are opened, the blend reaches the working space below the upper piston 7a. A part of the fuel bled pushes out the remaining exhaust gases into the exhaust manifold of the engine through the bottom outlet orifice 5c, whereas its substantial part remains in the working space of the upper part of the cylinder 2a below the upper piston 7a as fuel that will be used in the next work cycle, and then the work cycle of the engine is repeated. In this variant of the invention air that is derived from the fan W is supplied to the air inlet of the carburetor G, which aims at increasing speed of the blend flow through the carburetor G as well as at improvement of scavenging of the working spaces of both parts of the cylinder 2. The operation of the engine according to the invention in the second variant of the realization is similar to the aforementioned one, however it differs in that fuel is directly supplied from the fuel injectors 15a and 15b to the working spaces of the upper part of the cylinder 2a and to the bottom part of the cylinder 2b, while air supplied from the fan W following initial compression scavenges the working spaces of both parts of the cylinder 2, and moreover when it blends with fuel after the outlet orifices 5c and 6c are closed, it constitutes a new portion of the fuel blend that will be used in the next working cycle of the cylinder. Furthermore, in the work cycle of the engine that is being described, shortly after the ignition of compressed fuel in the cylinder space 2 below the upper piston 7a, and in the next proper phase of this cycle, shortly after the ignition of compressed fuel in the space of the cylinder 2 above the bottom piston 7b, a small amount of water is supplied to these spaces through the water injectors 15c and 15d. Water is led via the water cables 16 from the water tank 17 through the water heating element 19, which in this example appears in the form of the spiral metal tube, that is embedded on the exhaust manifold 20, as well as through the batching devices 18. Water undergoes initial heating in the water heating element 19 up to 100° C., whereas in the appropriate phases of the engine work measurement of its quantity takes place and a moment of the injection into the space of the cylinder 2 is arranged in the batching devices 18, whose work is steered from the external system of steering the engine work.

The separate lubrication system, which is known from four-stroke engines, is used in order to lubricate the piston and crank unit in the second variant of the engine realization.

The advantage of the second variant of the engine solution according to the invention is the lack of the use of the blend consisting of gasoline and lubricating oil as fuel, whereas in expelled exhaust gases there is no unburned fuel or lubricating oil. Therefore, there is no need to use a heavy resonant system necessary to turn back unburned fuel, whose purpose is to decrease the level of expelled pollution as it is observable in the previous solutions of the two-stroke engines.

Besides, the common convenience of the solution according to the invention in both variants of the engine realization is higher engine power obtained from one cylinder in comparison to the known two-stroke single-piston engines. Additionally, effectiveness of the engine according to the second version of the invention is improved by supplying a small amount of water of nearly boiling temperature, or slightly lower, to the combustion chamber.

The invention claimed is:

1. Internal combustion engine with two working spaces of a cylinder that comprises an engine case with a crankshaft equipped with a counterweight as well as there is at least one cylinder attached to the engine case with a reciprocating piston and crank unit located in it, and moreover the engine comprises sparking elements and a fuel feeding system of the cylinder, while the cylinder has side scavenging channels, which connect the suction space of the cylinder below the piston to the working space above the piston, apart from that inlet orifices to the suction space and outlet orifices from the working space are situated in the cylinder walls, characterized in that, the cylinder (2) fastened to the engine case (1) has a biconcave internal partition (3), which divides the cylinder (2) into the upper part of the cylinder (2a) and the bottom part of the cylinder (2b), whereas a plurality of sparking plugs (4a, 4b) are mounted on both sides of the biconcave internal partition (3) in the wall of the upper part of the cylinder (2) and in the wall of the bottom part of the cylinder (2b), besides the upper part of the cylinder (2a) has at least one upper scavenging channel (5a) and at least one upper inlet orifice (5b) and one upper outlet orifice (5c), while the bottom part of the cylinder (2b) has at least a bottom scavenging channel (6a) and at least the bottom inlet orifice (6b) and one bottom outlet orifice (6c), furthermore inside the upper part of the cylinder (2a) an upper piston (7a) is situated, and inside the bottom part of the cylinder (2b) a bottom piston (7b) is situated, while the upper piston (7a) and the bottom piston (7b) are directed towards each other by their convex working surfaces (8a, 8b), and they are connected to each other with the help of a rod (9) in the form of the ground shaft that is led through a linear bearing (10) that is mounted in the biconcave internal partition (3) on whose two sides sealing elements (10a, 10b) are placed, apart from that a connecting rod (11) is fastened to the bottom piston (7b) and by its other end it is connected to the crank (12) of the crankshaft (13), which is located in the crankcase (14) that constitutes the internal part of the engine case (1), wherein the combustion engine comprises a first fuel injector (15a) positioned proximate to the internal partition (3) in the wall of the upper part of the cylinder (2a) and a second fuel injector (15b) positioned proximate the internal partition in the wall on the bottom part of the cylinder (2b), and wherein combustion of the fuel occurs on both a first face of the internal partition (3) and a second face of the internal partition (3).

2. The internal combustion engine with two working spaces of a cylinder according to claim 1, characterized in that, a plurality of water injectors (15c, 15d) are situated in the wall of the upper part of the cylinder (2a) as well as in the wall of the bottom part of the cylinder (2b).

3. The internal combustion engine with two working spaces of a cylinder according to claim 1 or 2, characterized in that, the outlet of the common fan is attached to the upper inlet orifice and to the bottom inlet orifice.

4. The engine according to claim 1, characterized in that, the exit of a common carburetor (G) is attached to the upper inlet orifice (5b) and to the bottom inlet orifice (6b).

5. The engine according to claim 4, characterized in that, the outlet of the fan (W) is attached to the entry of the carburetor (G).

6. The internal combustion engine with two working spaces of a cylinder according to claim 2, characterized in that, the water injectors (15c, 15d) are connected to a water tank (17) via the water pipes (16) through the batching devices (18) assigned to them.

7. The internal combustion engine with two working spaces of a cylinder according to claim 6, characterized in that, a water heating element (19) is situated between the water tank (17) and particular batching devices (18), and it is embedded on an exhaust manifold (20) that is attached to exhaust passages (5c, 6c).

8. The internal combustion engine with two working spaces of a cylinder according to claim 1, characterized in that a butterfly valve mediates flow of the air-fuel mixture from the exit of the common carburetor (G) to the upper inlet orifice (5b) and to the bottom inlet orifice (6b).

* * * * *